United States Patent [19]
So et al.

[11] Patent Number: 5,179,420
[45] Date of Patent: Jan. 12, 1993

[54] OPTICAL TIME DOMAIN REFLECTOMETER USING A TUNABLE OPTICAL SOURCE

[75] Inventors: Vincent C.-Y. So, Ottawa; Michel Lessard, St. Hubert, both of Canada

[73] Assignee: Bell Canada, Montreal, Canada

[21] Appl. No.: 713,252

[22] Filed: Jun. 7, 1991

[51] Int. Cl.$^5$ .................. G01N 21/88; G01N 21/59
[52] U.S. Cl. .................................................. 356/73.1
[58] Field of Search ....................................... 356/73.1

[56] References Cited

U.S. PATENT DOCUMENTS

| | | | |
|---|---|---|---|
| 3,588,253 | 6/1971 | Wittmann | 356/425 |
| 4,737,026 | 4/1988 | Dalgoutte et al. | 356/73.1 |
| 4,911,515 | 3/1990 | So et al. | 350/96.16 |
| 4,984,884 | 1/1991 | Ryu et al. | 356/73.1 |

FOREIGN PATENT DOCUMENTS 2-281122  11/1990  Japan ................. 356/73.1

OTHER PUBLICATIONS

Nakazawa et al "Optical Time Domain Reflectometry at a Wavelength of 1.5 μm Using Stimulated Roman Scattering in Multimode, Graded-Index Optical Fiber" J. Appl.-Phys. 53 (3) Mar. 1982 pp. 1391-1393.

Kawasaki et al. "Optical Time Domain Reflectometer For Single-Mode Fiber a Selectable Wavelengths", Appl. Phys. Lett. 38(10) May 15, 1981, pp. 740-742.

Anffret et al "Field Measurement Set For Attenuation & Bandwidth of Optical Links" Electronics Letters (Oct. 9, 1981, vol. 16 #21 pp. 798-799.

"Automation of an Optical Time Domain Reflectometer to Measure Loss and Return Loss", Vincent C. Y. So et al., *Journal of Lightwave Technology*, vol. 8, No. 7, pp. 1078-1083, Jul. 1990.

"In-line testing for fiber subscriber loop applications", J. W. Jiang et al., Society of Photo-Optical Instrumentation Engineers vol. 1363 *Fiber Optics in the Subscriber Loop* (1990), pp. 191-195, Sep. 1990.

Primary Examiner—Vincent P. McGraw

[57] ABSTRACT

In an optical time domain reflectometer (OTDR), an optical signal is coupled to an optical fiber path to be tested, and back-scattered and reflected light from the optical fiber path is detected and used to determine loss-distance characteristics of the path. A control unit varies the wavelength of the optical signal by varying the temperature of a semiconductor laser constituting the optical source, so that the loss-distance characteristics for a plurality of different wavelengths are determined and can be displayed to show any wavelength dependent loss of the optical fiber path, which loss may be due to modal interference associated with closely spaced discontinuities in the path.

13 Claims, 2 Drawing Sheets

OPTICAL TIME DOMAIN REFLECTOMETER USING A TUNABLE OPTICAL SOURCE

This invention relates to an optical time domain reflectometer, or OTDR, and to a method of using an OTDR for determining characteristics of an optical fiber path in an optical communications system.

BACKGROUND OF THE INVENTION

It is well known to use an OTDR to determine or monitor loss characteristics of an optical fiber path in an optical communications system. With increasing use of optical communications, and with extension of optical fiber communications to subscribers' premises, there is an increasing need for such monitoring in a convenient and effective manner. In particular, it is desirable to facilitate central monitoring of the characteristics of optical fibers leading to many subscribers' premises from a central location, without gaining access to the remote ends of the fibers, as is done with automatic loop testing on conventional copper subscriber lines. In So et al. U.S. Pat. No. 4,911,515, issued Mar. 27, 1990, entitled "Optical Fiber Communications System With Optical Fiber Monitoring", and assigned to Northern Telecom Limited, there is described an OTDR arrangement which facilitates such central monitoring.

Optical fibers which are currently used in optical communications systems are predominantly "single mode" fibers, in that one mode ($LP_{01}$) is propagated over large distances with relatively little attenuation or loss, whereas other, higher order, modes are heavily attenuated over such distances, so that only the one mode is effectively propagated over a long length of an optical fiber communications path. At any discontinuity in an optical fiber path, such as occurs at an optical fiber splice or optical connector, a portion of the light travelling in the fiber core is lost, the majority of the lost light being transferred from the $LP_{01}$ mode to the $LP_{11}$ mode. As is known, the $LP_{11}$ mode travels faster than the $LP_{01}$ mode, but is relatively quickly attenuated.

A problem arises, however, if two discontinuities occur only a relatively short distance apart. In such a situation, at the second discontinuity the $LP_{11}$ mode can have sufficient power that some of it can be converted back into the $LP_{01}$ mode, this recoupled light then being propagated along the fiber and interfering with the desired $LP_{01}$ mode signal, with which it is no longer synchronized due to the different velocities of the $LP_{01}$ and $LP_{11}$ modes between the two discontinuities. The net effect of this is modal interference, or modal noise, which appears as a wavelength dependent loss of the optical fiber path.

Such relatively closely spaced discontinuities may occur in a variety of situations, for example with repeated splicing of an optical fiber, with the use of optical fiber patch cords, or with the use of certain types of optical connectors which incorporate a short length of fiber to facilitate field assembly of the connectors. Generally, in any situation where there is less than a few meters of fiber between two successive discontinuities, there is a potential for modal interference as described above.

OTDRs conventionally used for optical communications systems have a resolution of, at best, about 0.1 m, and accordingly are unable to resolve between discontinuities closer apart than this, merely indicating the combined loss of the two discontinuities as though there is only a single discontinuity. Accordingly, conventional OTDRs fail to assist in determining the existence and location of such discontinuities. It should be appreciated that the combined loss of two closely spaced discontinuities may not be particularly great, but the modal interference may be sufficient to cause significant degradation of the optical communications path, leading to excessive transmission error rates. Furthermore, it should be appreciated that the wavelength dependent nature of the loss due to this modal interference may mean that the errors are intermittent or vary with time, due to small changes in the wavelength of the light being transmitted via the fiber.

An object of this invention, therefore, is to provide an improved OTDR which facilitates the detection of such closely spaced discontinuities.

SUMMARY OF THE INVENTION

According to one aspect of this invention there is provided an optical time domain reflectometer (OTDR) comprising: means for producing an optical signal; coupling means for coupling the optical signal to an optical fiber path; means for detecting light from the optical fiber path; means responsive to the detected light for determining loss-distance characteristics of the optical fiber path; control means for varying a wavelength of the optical signal; and display means responsive to the control means for displaying information representative of the determined loss-distance characteristics for a plurality of different wavelengths of the optical signal.

Thus the invention provides an OTDR which can operate at a plurality of different optical signal wavelengths, to provide loss-distance characteristics for these wavelengths which indicate any wavelength dependent loss of the optical fiber path, which wavelength dependent loss may be produced by closely spaced discontinuities as discussed above.

The means for producing an optical signal conveniently comprises a tunable optical source controlled by the control means. Advantageously the tunable optical source comprises a semiconductor laser and the control means comprises means, such as thermoelectric cooling means, for controlling an operating temperature of the semiconductor laser.

The OTDR may also include means for monitoring the wavelength of the optical signal.

According to another aspect the invention provides a method of using an OTDR for determining characteristics of an optical fiber path, comprising the steps of: producing an optical signal; coupling the optical signal to the optical fiber path; detecting light from the optical fiber path; in response to the detected light, determining loss-distance characteristics of the optical fiber path; varying a wavelength of the optical signal; and in response to the control means, displaying information representative of the determined loss-distance characteristics for a plurality of different wavelengths of the optical signal.

The determined characteristics may comprise modal interference and/or chromatic dispersion of the optical fiber path.

BRIEF DESCRIPTION OF THE DRAWINGS

The invention will be further understood from the following description with reference to the accompanying drawings, in which.

DESCRIPTION OF THE PREFERRED EMBODIMENT

Figure 1:
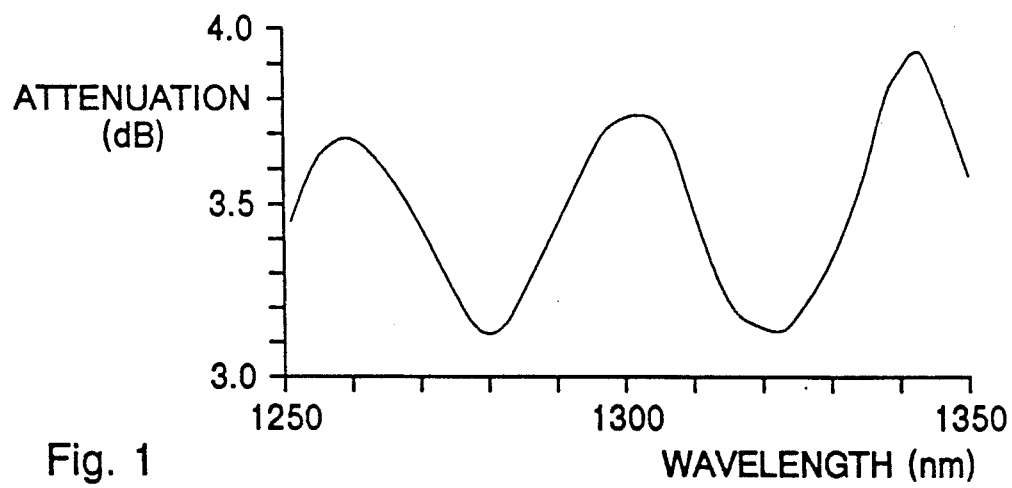
FIG. 1 is a graph illustrating the wavelength dependent attenuation of an optical fiber path due to two closely spaced discontinuities.

FIG. 1 is a graph which illustrates a typical variation in attenuation of a single mode optical fiber path, as a function of wavelength in the region of 1300 nm at which the optical fiber path is intended to operate, due to the presence of two discontinuities spaced relatively closely apart; in this case the discontinuities are two optical fiber splices spaced 15 mm apart.

As is illustrated in FIG. 1, the attenuation or loss of an optical signal propagated via this optical fiber path is of the order of a few dBs, but varies by a significant amount with small changes in wavelength, up to about 0.8 dB as illustrated for a wavelength change of 20 nm. The particular characteristics and wavelength dependence of the loss depend upon the nature and spacing of the discontinuities, but in any event there may be a wavelength dependence of the loss which is not determinable using conventional OTDRs. Furthermore, the close spacing of the discontinuities means that these are not resolvable using conventional OTDRs.

In an optical communications system in which such an optical path is present, the loss due to the two closely spaced discontinuities may not initially be a problem. For example, if the optical signal has a wavelength of 1280 nm, then as illustrated in FIG. 1 the loss is at a minimum and possibly acceptable level, considering the total loss for the system as a whole. However, with changes in operating temperature, and with aging and possible substitution of equipment, the optical signal wavelength may change to a point at which the additional loss, due to the wavelength dependence as shown in FIG. 1, is sufficient to cause degradation of the optical signal propagation, resulting in increased bit error rates. Such degradation may be intermittent, and consequently very difficult to diagnose unless there is an appreciation that it is caused by modal interference due to the closely spaced discontinuities.

Figure 2:
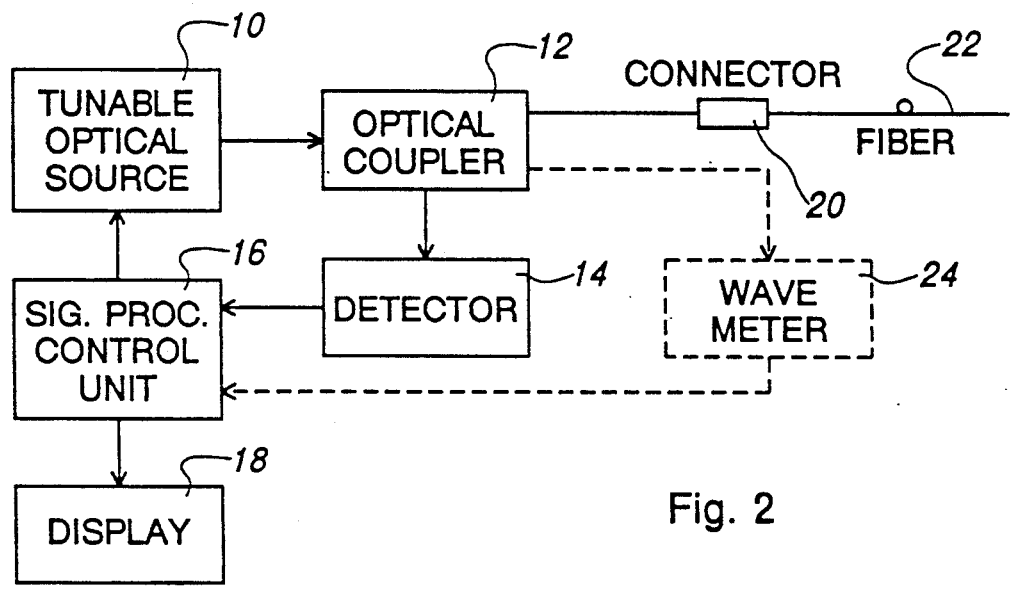
FIG. 2 is a block diagram illustrating an OTDR in accordance with an embodiment of this invention.

Referring to FIG. 2, there is illustrated in a block diagram an OTDR, in accordance with an embodiment of this invention, which can be used to determine faults in an optical fiber path such as the two closely spaced discontinuities as discussed above. The OTDR comprises a tunable optical source 10, an optical coupler 12, an optical detector 14, a signal processing control unit 16, a display 18, and an optical fiber connector 20 to which an optical path to be tested, represented in FIG. 2 by a fiber 22, is coupled. The OTDR may also optionally include a wave meter 24 as shown in broken lines in FIG. 2. For monitoring of many optical fiber paths in an optical fiber communications system, the OTDR may be arranged as described in U.S. Pat. No. 4,911,515 already referred to.

As is known in the art, in a conventional OTDR an optical signal at a single wavelength is coupled to an optical fiber path, and light which is back-scattered and reflected due to faults is detected to provide a loss-distance characteristic for the path. The OTDR of FIG. 2 operates in a similar manner, with the additional feature that the wavelength of the optical signal is controllably varied to provide a plurality of loss-distance characteristics for different wavelengths, so that any wavelength dependent nature of the path, which is typically due to closely spaced discontinuities as discussed above, is clearly determined. As in conventional OTDRs, the loss-distance characteristics can be displayed by the display 18 in any convenient form, for example in graphical and/or tabular form as desired. For clarity and simplicity, in the drawings these characteristics are illustrated in graphical form, and the following description is worded accordingly.

The tunable optical source 10 is controlled by the signal processing control unit 16 to produce an optical signal at a desired and controlled wavelength. This optical signal is coupled via the coupler 12 to the connector 20 and thence to the optical fiber path 22 to be tested. The optical signal is also coupled to the wave meter 24 when this is provided, the wave meter 24 measuring the wavelength of the optical signal and providing a corresponding electrical signal to the control unit 16. In the absence of the wave meter 24, the OTDR is calibrated so that the wavelength of the optical signal generated by the source 10 is precisely determined by the control unit 16.

Light which is back-scattered and reflected in the optical fiber path 22 is coupled via the connector 20 and optical coupler 12 to the detector 14, where it is detected to provide a corresponding electrical signal to the signal processing control unit 16. The unit 16 provides to the display the resulting loss-distance characteristic for the particular wavelength of the optical signal. This process is performed for two or more different wavelengths, which result in different characteristics if there is a wavelength dependent loss of the optical fiber path 22. The location and nature of such a wavelength dependent loss is then readily apparent from the information displayed by the display 18, as is further described below.

Figure 3:
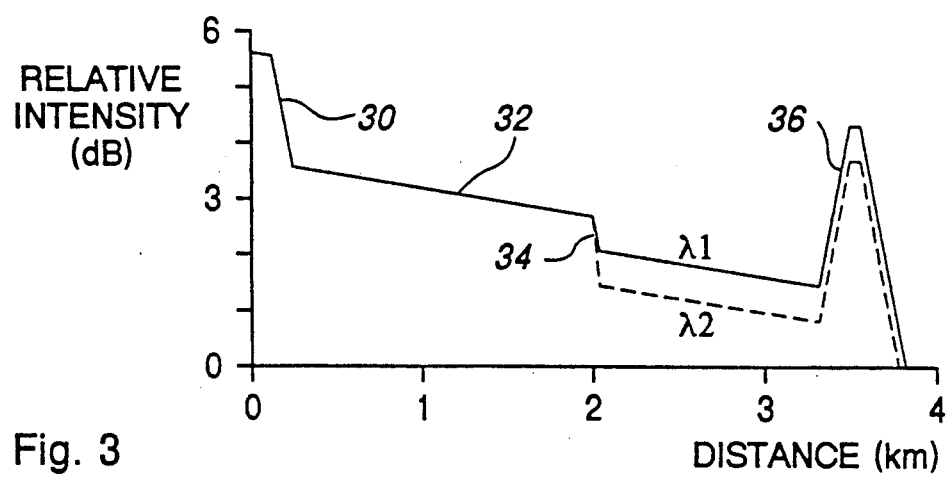
FIG. 3 is a graph illustrating results of operation of the OTDR of FIG. 2.

FIG. 3 illustrates a graphical display resulting from operation of the OTDR of FIG. 2 at two different wavelengths, λ1 and λ2, shown by continuous and broken lines respectively, with an optical fiber path 22 having two closely spaced optical splices at a distance of about 2 km from the OTDR. In a manner well known in the OTDR art, the graph illustrates relative intensity as a function of distance along the optical fiber path, showing an initial loss 30 due to the connector 20, a slope 32 due to attenuation of the optical signal in the fiber, a loss 34 due to the splices, and a final spike 36 due to an end connector of the optical fiber path. As already discussed, the OTDR display does not resolve the two splices due to their close separation, and accordingly for each wavelength λ1 or λ2 these appear in the display as a single fault.

As FIG. 3 illustrates, however, there is a significant difference between the loss 34 determined by the OTDR at the two different wavelengths λ1 and λ2, the wavelength dependent attenuation of the two closely spaced splices being appreciably greater at the wavelength λ2 than at the wavelength λ1, as explained with reference to FIG. 1. Accordingly, the display produced by the OTDR clearly indicates that at this point there is a fault having a wavelength dependent attenuation, such as is caused by modal interference due to two closely spaced discontinuities.

Although not further described here, it should be appreciated that the OTDR may provide, from the wavelength dependent loss characteristics which it determines for any fault in the optical fiber path, not only the location and attenuation of the fault, but also an indication of the nature of the fault. For example, the control unit 16 may be provided with stored information typical of the wavelength dependent attenuation of particular situations, and may correlate the wavelength dependent information relating to each fault, such as that represented by the loss 34, with this stored information to provide an indication of what situation is to be expected at the location of the fault. Such information is of considerable value to service personnel in identifying and rectifying faults.

The OTDR of FIG. 2 differs from conventional OTDRs in particular in that its optical source 10 is tunable, the wavelength tuning being controlled by the control unit 16. Various forms of tunable optical source, such as semiconductor lasers, are known and may be used as the source 10. It is convenient, however, for the source 10 to be constituted by a conventional semiconductor laser whose temperature is controlled to control the wavelength of the optical signal.

Figure 4:
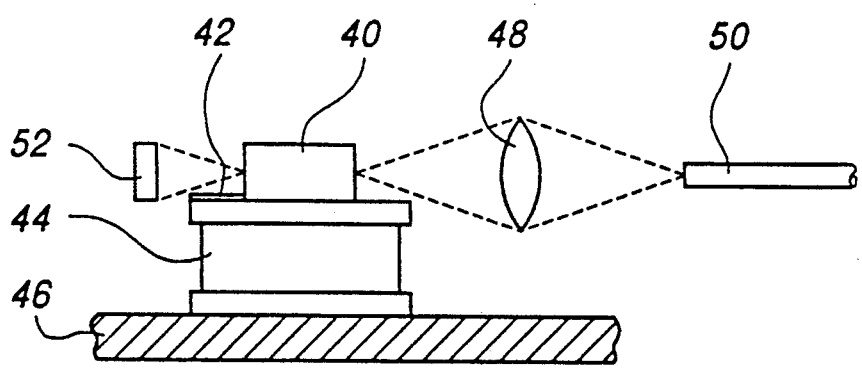
FIG. 4 schematically illustrates parts of an optical source which may be used in the OTDR of FIG. 2.

FIG. 4 illustrates parts of a known semiconductor laser device package, which comprises a semiconductor laser 40 and a temperature sensor 42 mounted on a semiconductor thermo-electric cooler 44 which is in turn mounted on a thermal interface 46. An optical signal produced by the semiconductor laser is coupled via an optical system represented by a lens 48 to an optical fiber 50, and light emitted from a back face of the semiconductor laser is monitored by a light-sensitive diode 52. Conventionally, the thermo-electric cooler 44 is controlled to maintain a constant temperature, as monitored by the temperature sensor 42, of the semiconductor laser and hence a constant wavelength of the optical signal.

Using such a semiconductor laser device package to constitute the tunable optical source 10 of the OTDR of FIG. 2, the temperature of the semiconductor laser 40 is controlled by the control unit 16, via the thermo-electric cooler 44, to produce the optical signal with variable, controlled, wavelengths. The semiconductor laser 40 has an operating temperature range of about −20° C. to about 80° C. and produces the optical signal with a wavelength which changes at a rate of about 0.3 nm/° C., so that the wavelength of the optical signal can be readily varied through a range of 30 nm. As can be seen from FIG. 1, this range is sufficient for any wavelength dependent losses in an optical fiber path being tested to be clearly identified.

In the event that a greater tuning range is desired, for example for testing a wavelength division multiplexed optical communications system as discussed below, the temperature control described above can be replaced or supplemented by using a tunable semiconductor laser of known form or by using a plurality of semiconductor lasers of different wavelengths which are selectively used to provide the optical signal. In any event, the optical signal wavelength may be controllably varied either in a continuous manner or in discrete steps over a desired range, so that the OTDR provides wavelength dependent loss information for the optical fiber path being tested.

The OTDR of FIG. 2 can also be used for determining chromatic dispersion of single mode optical fiber paths. Although chromatic dispersion test equipment already exists, such equipment is expensive and requires access to both ends of the optical fiber path. In contrast, the OTDR of FIG. 2 only requires access to one end of the optical fiber path, and can serve the dual purpose of fault location and chromatic dispersion measurement.

Figure 5:
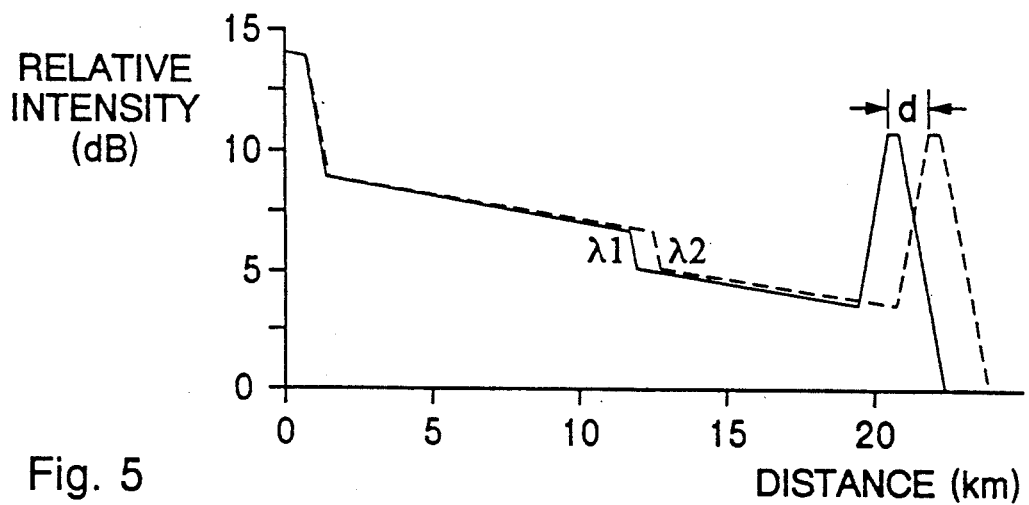
FIG. 5 is a graph illustrating operation of the OTDR of FIG. 2 for determining chromatic dispersion.

For measurement of the chromatic dispersion of a relatively long optical fiber path (chromatic dispersion is only significant for relatively long paths), the OTDR of FIG. 2 is operated as described above with two different wavelengths of the optical signal, for example separated by 30 nm as discussed above. A resulting display for the two wavelengths λ1 and λ2, assuming no wavelength dependent loss, is illustrated in FIG. 5 using solid and broken lines respectively in a similar manner to the illustration in FIG. 3. The end reflections for the two wavelengths are separated from one another, due to chromatic dispersion, by a distance d which is determined by the OTDR. The distance d provides a measurement of the chromatic dispersion. For a typical chromatic dispersion of approximately 3 ps/nm/km, a wavelength difference of 30 nm as discussed above, and an optical fiber path of 20 km with an optical signal speed of approximately 0.2 m/ns, the distance d determined by the OTDR is 0.72 m, which is well within the resolution of the OTDR.

Figure 6:
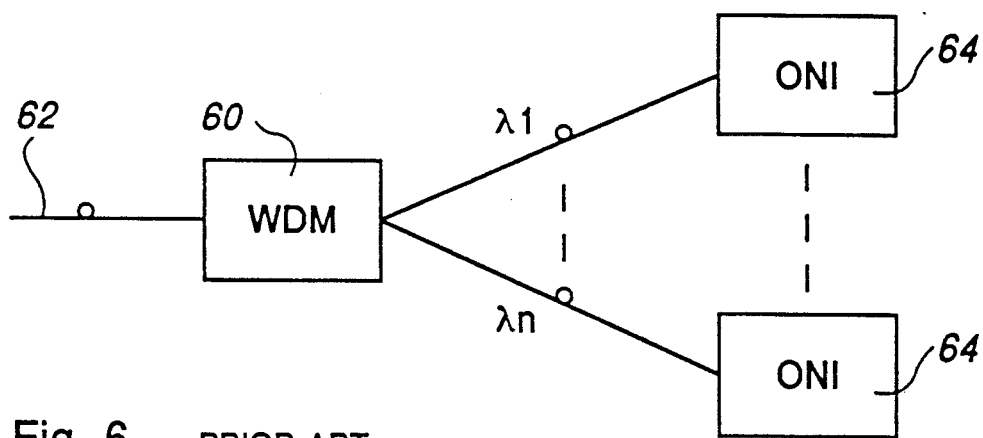
FIG. 6 schematically illustrates parts of a wavelength division multiplexed optical communications system with which the OTDR of FIG. 2 may be advantageously used.

FIG. 6 illustrates parts of a wavelength division multiplexed optical communications system of known form, in which a wavelength division demultiplexer (WDM) 60 couples wavelength multiplexed optical signals having respective wavelengths λ1 to λn from an optical fiber path 62 to respective optical network interfaces (ONI) 64. With such an arrangement, the optical signal from a conventional OTDR coupled to the optical fiber path 62 at its end remote from the ONIs 64 can be routed to only one of the ONIs 64 according to its wavelength, but the OTDR will be unable to determine characteristics of all of the other optical fiber paths beyond the WDM 60. In contrast, using an OTDR with a tunable optical source 10 as described above with reference to FIG. 2, the wavelength of the optical signal can be tuned selectively to be routed to each of the ONIs 64 in turn, so that the characteristics of all of the optical paths leading to the ONIs 64 can be determined by the remote OTDR. As the range of wavelengths λ1 to λn will generally exceed the thermal tuning range of a single semiconductor laser as described above with reference to FIG. 4, in this case the tunable optical source preferably comprises a conventional tunable laser or a plurality of semiconductor lasers whose optical signals have the different wavelengths λ1 to λn and are used selectively by the OTDR.

Numerous modifications, variations, and adaptations may be made to the described embodiments of the invention without departing from the scope of the invention as defined in the claims.

What is claimed is:

1. An optical time domain reflectometer (OTDR) comprising:
    an optical source for producing an optical signal, and coupling means for coupling the optical signal to an optical fiber path, the optical source being tunable over a range of wavelengths in the region of a prescribed wavelength for said optical fiber path;

means for detecting light from the optical fiber path;

means responsive to the detected light for determining loss-distance characteristics of the optical fiber path;

control means for controlling the optical source to vary the wavelength of the optical signal over said range; and display means responsive to the control means for displaying information representative of the determined loss-distance characteristics for a plurality of different wavelengths of the optical signal within said range.

2. An OTDR as claimed in claim 1 wherein the tunable optical source comprises a semiconductor laser and the control means comprises means for controlling an operating temperature of the semiconductor laser.

3. An OTDR as claimed in claim 2 wherein the means for controlling an operating temperature of the semiconductor laser comprises thermo-electric cooling means.

4. An OTDR as claimed in claim 2 and including means for monitoring the wavelength of the optical signal.

5. An OTDR as claimed in claim 1 and including means for monitoring the wavelength of the optical signal.

6. A method of using an OTDR for determining characteristics of an optical fiber path, comprising the steps of:

producing an optical signal using an optical source, the optical source being tunable over a range of wavelengths in the region of a prescribed wavelength for said optical fiber path;

coupling the optical signal to the optical fiber path;

detecting light from the optical fiber path;

in response to the detected light, determining loss-distance characteristics of the optical fiber path;

controlling the optical source using a control means to vary a wavelength of the optical signal over said range; and in response to the control means, displaying information representative of the determined loss-distance characteristics for a plurality of different wavelengths of the optical signal within said range.

7. A method as claimed in claim 6 wherein the step of varying the wavelength of the optical signal comprises controlling an operating temperature of a semiconductor laser which constitutes the tunable optical source.

8. A method as claimed in claim 7 wherein the step of controlling the operating temperature of the semiconductor laser comprises thermo-electrically cooling the semiconductor laser.

9. A method as claimed in claim 6 and including the step of monitoring the wavelength of the optical signal.

10. A method as claimed in claim 6 wherein the determined characteristics comprise modal interference of the optical fiber path.

11. A method as claimed in claim 6 wherein the determined characteristics comprise chromatic dispersion of the optical fiber path.

12. An optical time domain reflectometer (OTDR) comprising:

an optical source for producing an optical signal, the optical source being tunable to vary wavelength of the optical signal within a range of wavelengths differing by up to about 100 nm;

coupling means for coupling the optical signal to an optical fiber path;

means for detecting light from the optical fiber path;

means responsive to the detected light for determining loss-distance characteristics of the optical fiber path;

control means for controlling the optical source to vary a wavelength of the optical signal within said range; and display means responsive to the control means for displaying information representative of the determined loss-distance characteristics for a plurality of different wavelengths of the optical signal within said range.

13. An OTDR as claimed in claim 12, wherein said optical source is tunable to vary said wavelength over a range of about 30 nm.

* * * * *